UNITED STATES PATENT OFFICE.

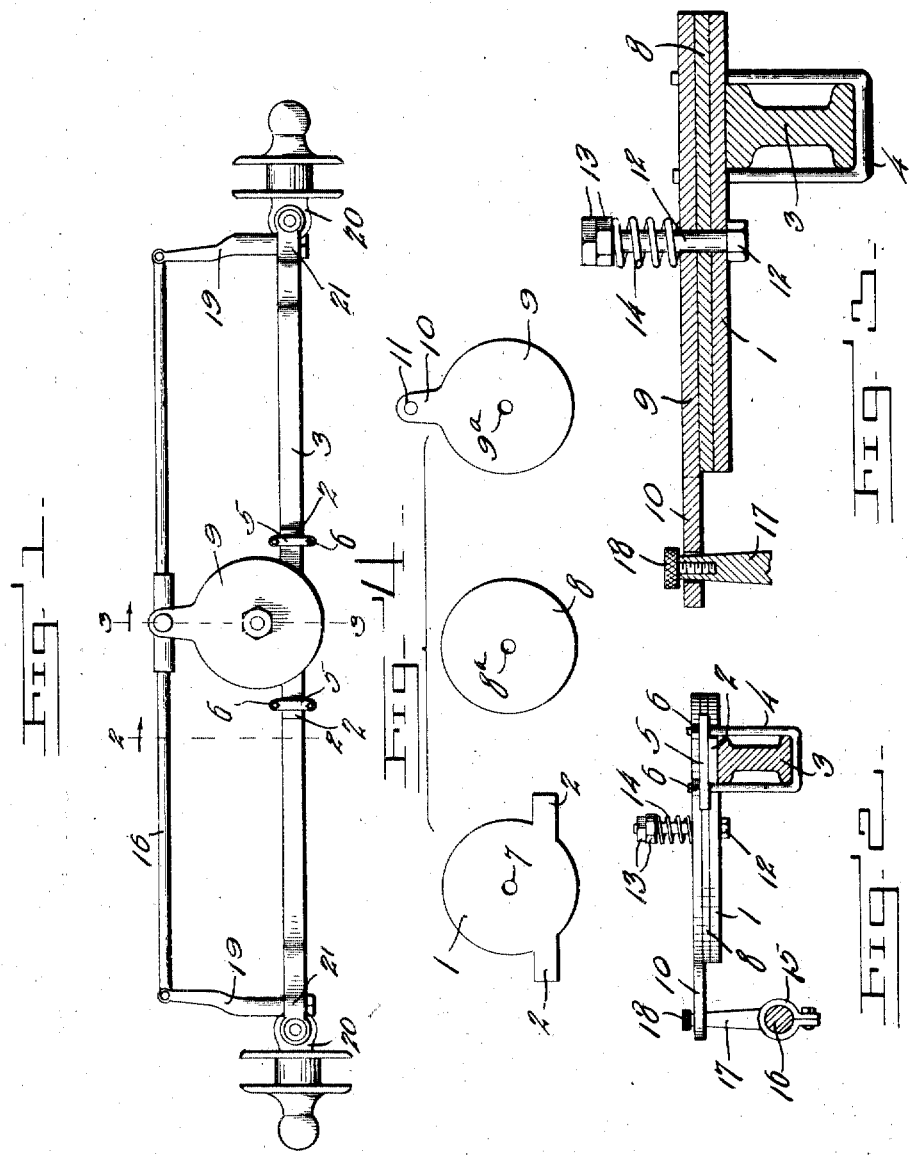

EMIL R. MILLER, OF WILLOW LAKE, SOUTH DAKOTA.

AUTOMOBILE ATTACHMENT.

1,232,952.  Specification of Letters Patent.  Patented July 10, 1917.

Application filed November 3, 1916. Serial No. 129,365.

*To all whom it may concern:*

Be it known that I, EMIL R. MILLER, a citizen of the United States, residing at Willow Lake, in the county of Clark and State of South Dakota, have invented certain new and useful Improvements in Automobile Attachments, of which the following is a specification.

This invention relates to automobile attachments, and more particularly to an attachment for preventing looseness or play of the steering gear of an automobile.

One of the main objects of the invention is to provide a device of the character stated which can be quickly and easily applied to an automobile of standard construction. A further object is to provide a device which can be adjusted so as to vary the resistance offered to free movement of the steering gear to suit circumstances. Further objects will appear from the detailed description.

In the drawings:—

Figure 1 is a top plan view of the device as applied;

Fig. 2 is a section on line 2—2 of Fig. 1;

Fig. 3 is a section on line 3—3 of Fig. 1; and

Fig. 4 is a top plan view of the device in disassembled condition.

The disk 1 of steel or other suitable material is provided with the alined laterally extending arms 2 adapted to fit on the upper face of the front axle 3 of an automobile, at the center thereof. A suitable U-clip 4 is passed about the axle 3 and has its arms passed through plate 5 positioned above arm 2 of disk 1. A nut 6 is threaded on each arm of the clip 4 and acts to force the bar 5 into tight frictional engagement with arm 2, thus securing the disk 1 to the axle 3. Disk 1 is further provided with a center aperture 7. A suitable washer 8 of asbestos, leather, or other suitable material is mounted on the upper face of disk 1 and is provided with a central aperture 8ª in alinement with the aperture of the disk. A disk 9 is mounted on top of washer 8 and is provided with a central aperture 9ª and an integral rearwardly extending arm 10 which is provided at its outer end with an aperture 11. A pivot bolt 12 is inserted through the alined apertures of the disks and washer and extends above the upper disk 9. Two jam nuts 13 are threaded on the upper end of this bolt and an expansion coil spring 14 is mounted about the bolt and confined between nuts 13 and disk 9. This spring acts to force the disk 9 toward the disk 1 into tight frictional engagement with the washer 8. By this means a braking effect is exerted on disk 9 so as to retard every rotation of the same about the pivot bolt 12. By threading the nuts 13 on to the bolt 12, the compression of the spring 14 may be varied so as to increase or diminish the pressure on disk 9, as desired, thus rendering it possible to adjust the resistance to rotation of the disk to suit circumstances.

A split sleeve 15 is secured on the transversely extending steering rod 16 at the longitudinal center thereof. This sleeve is provided with an integral upwardly extending tapered stud 17 the upper end of which fits into the aperture 11 of arm 10 of disk 9. The upper end of stud 17 is recessed and interiorly threaded to receive a cap screw 18 which acts to prevent the arm 10 of disk 9 from becoming disengaged from the stud. The steering rod 16 is pivotally secured at each end to the inner end of the arm 19 of a steering spindle 20 which is pivoted in the usual fork 21 at the end of axle 3. By this means, when the steering rod 16 is shifted in either direction the disk 9, due to its frictional engagement with the fixed disk 1, will prevent looseness or play of rod 16 thus insuring smoothness and accuracy of operation of the steering gear. By adjusting the jam nuts 13 on the pivot bolt 12 the amount of resistance to the rotation of disk 9 may be varied to suit circumstances, thus providing simple and efficient means whereby the control of the steering gear may be varied to suit conditions.

There may be slight changes made in the construction and arrangement of the different parts of my invention without departing from the field and scope of the same, and I intend to include all such variations, as fall within the scope of the appended claim, in this application in which the preferred form only of my invention is disclosed.

What I claim is:

The combination with an axle provided at each end with a fork, spindles mounted in said forks and having rearwardly extending steering arms, and a continuous steering rod pivotally secured at each end to said arms; of a lower disk provided with integral laterally extending arms adapted to fit on the upper face of said axle, said arms being in the plane of the disk, U-clips secured about the axle and the arms of said disk, an upper disk rotatably mounted on the lower disk, a wearing member interposed between said disks, the said upper disk being provided with an integral rearwardly extending arm, pivotal connections between said arm of the upper disk and said steering rod intermediate the ends thereof, and means for forcing said disks toward each other into tight frictional engagement with said wearing member.

In testimony whereof I affix my signature in presence of two witnesses.

EMIL R. MILLER.

Witnesses:
BERT A. MILLER,
G. C. BERRY.